March 29, 1932. G. RAUSCH 1,851,328
DOUGH DIVIDING AND KNEADING MACHINE
Filed Sept. 9, 1929 3 Sheets-Sheet 1

March 29, 1932. G. RAUSCH 1,851,328
DOUGH DIVIDING AND KNEADING MACHINE
Filed Sept. 9, 1929 3 Sheets-Sheet 2
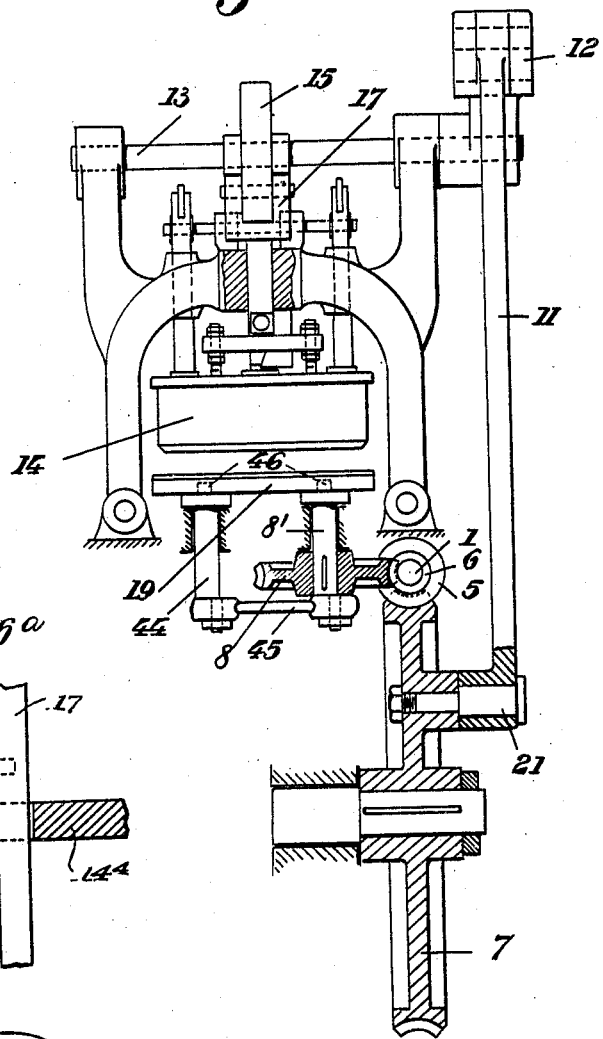
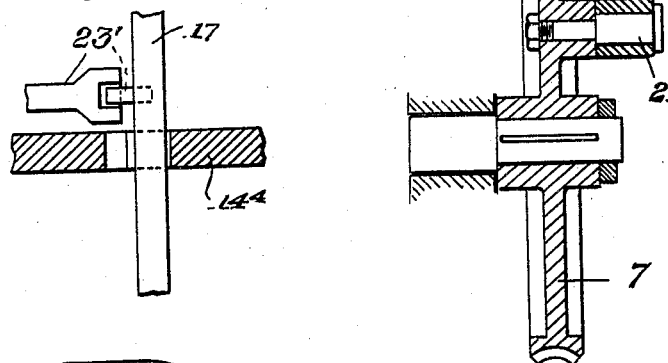
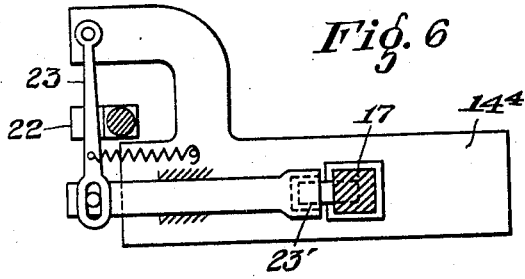
Inventor:
Gottfried Rausch
by Sydney J. Prescott
Attorney Patented Mar. 29, 1932

1,851,328

UNITED STATES PATENT OFFICE

GOTTFRIED RAUSCH, OF AMMENDORF, NEAR HALLE ON SAALE, GERMANY

DOUGH DIVIDING AND KNEADING MACHINE

Application filed September 9, 1929, Serial No. 391,454, and in Germany February 21, 1929.

The invention relates to an automatic dough dividing and kneading machine, particularly to a machine of this type having worm and wheel gearing, wherein, by means of suitable controls derived from the driving shaft, the several operative processes (such as closure of the press mould, moulding, dividing, coupling and uncoupling the kneading movement and so forth) take place automatically until the main shaft is declutched at the finish of a working process.

The invention has for its object to simplify materially the erection of and attendance on the machine while increasing the accessibility of all working parts. This is effected by simplifying the drive and the control of the dividing mechanism, the moulding plate and the dividing knife as well as of the kneading movement, control of these parts being so effected that their operative periods can be adapted to the working of the machine and to the consistency of the dough to be worked up at any given time. With these and other objects not specifically mentioned in view, the invention consists in certain constructions and combinations which will be hereinafter fully described and then specifically set forth in the claims hereunto appended.

In the known automatic knife-star dough dividing and kneading machines, wherein the control cams are arranged on the main worm wheel itself the transmission of the forces exerted by these cams to the motion-work of the moulding plate and to the dividing knife is carried out in a very unsatisfactory manner. The power transmitting parts can only engage unilaterally, rendering the machine difficult of supervision and also militating against a convenient general arrangement of the machine. These objections can be removed by arranging the cams or cam plates for the operation of the working parts upon a separate shaft which is driven from the main worm wheel by means of a pitman, crosshead, toothed gear or the like. From the constructional standpoint complete freedom of choice is possible in respect of the position of this shaft relatively to the controlling members. The shaft with the operating cams can thus be arranged in any position which seems to be best suited to ensure the most efficient power transmission and the best general arrangement of the machine. To this must be added the further advantage that the pitman or the like is very convenient for converting the rotary motion of the machine drive into the reciprocating motion necessary for operating the dividing mechanism. For the purpose of varying the duration of movement it is very convenient to adjust one, at least, of the points of engagement of this transmission gear.

Further simplification is introduced by operating the moulding and the dividing mechanisms successively from one curve or cam only. For the regulation of the pressure stroke also, there is provided a coupling-member which is adjustable for any desired level of the moulding plate, this coupling member determining the lower limit of the press stroke without affecting the movement of the dividing knife, for instance, by disconnecting the press stamp from the knife star motion.

In order that the kneading period may be varied the coupling members for engaging and disengaging the kneading clutch are preferably adjustable. For instance, the lengths of the control cams determining the duration of kneading may be variable, or stops serving to engage and disengage the clutch of the kneading gear may be carried adjustably on the control gear. Furthermore, the handle for starting up the machine is preferably so arranged that the machine can be shut down by hand, not only at the end of the working process but at any time and in any desired position during its operation. Thus the machine can be brought to a standstill immediately in case of any disturbance or irregularity in working.

One of the numerous forms of construction which the new machine may take is illustrated diagrammatically in the accompanying drawings, in which:

Fig. 2 is a front elevation of the same shown partly in section;

Fig. 6 is a detail plan view of the carrier plate for the pressure plate, and the means for coupling the carrier plate to the dough dividing mechanism;

Fig. 6a is a detail view showing the coupling on the carrier plate in engagement with the guide rod of the dough dividing mechanism.

Figure 1:
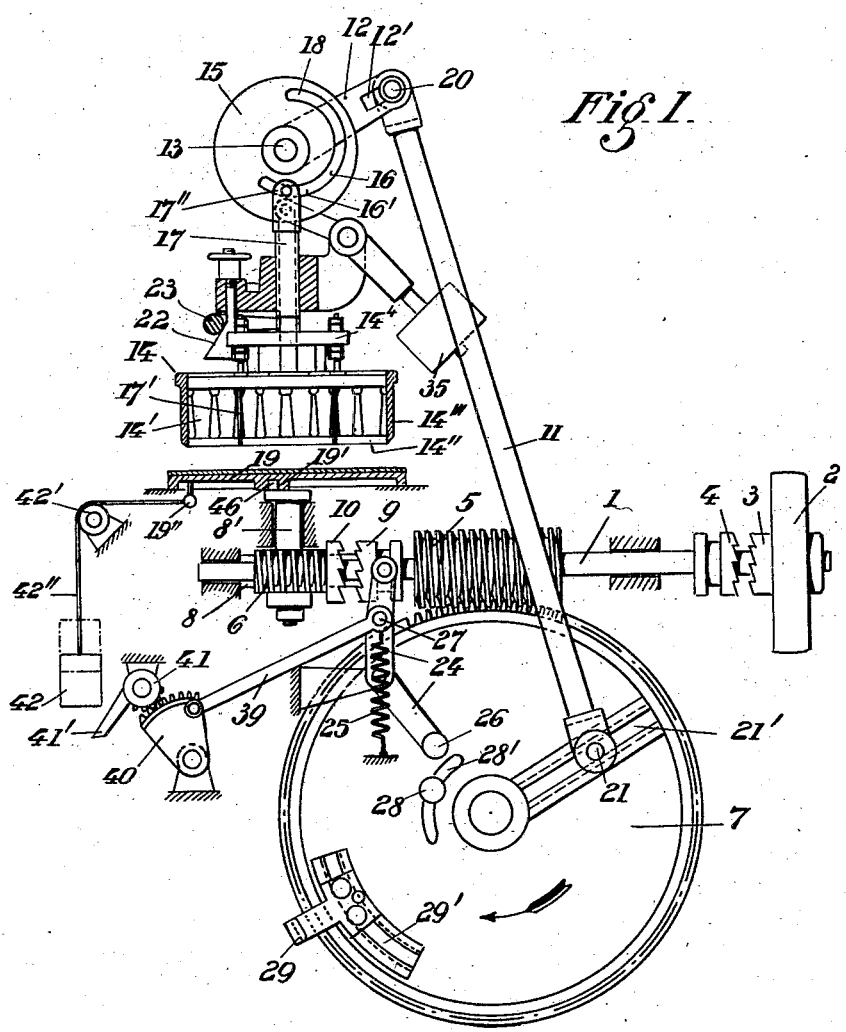
Fig. 1 is a sectional side elevation of the machine.

In carrying the invention into effect there is provided means for dividing the dough, means for working the dough, and mechanism for actuating said means. In the best constructions, this mechanism includes means for connecting the dough dividing and working means and a clutch mounted on the main shaft. In the best constructions, also, there is provided a dough carrying table and means for operating said table including a clutch, and means for returning it to initial position. These various means and parts may be widely varied in construction within the scope of the claims, for the particular invention selected to illustrate the invention is but one of many possible concrete embodiments of the same. The invention, therefore, is not to be restricted to the specific construction shown and described.

The main shaft 1 carries the belt pulley 2 to which it can be coupled by means of a clutch 3, 4 of any preferred kind. On the main shaft are mounted two worms 5, 6. While the worm 5 is engaged by the worm wheel 7 from which the principal control motions are derived, the worm 6, which rotates the worm wheel 8 to operate the dough carrying table has to be coupled to the main shaft 1 by a clutch 9, 10.

The worm wheel 7 is preferably mounted in the foot of the machine. In the example illustrated it is engaged by a pitman 11 which through the medium of a crank arm 12, oscillates a shaft 13 which, as clearly shown, is preferably located over the operating member of the dough dividing device 14. The shaft 13 carries a cam—a cam disc or guide disc 15, by the cam portion 16 of which the dividing knife 17', mounted on the guide rod 17, is reciprocated. For this purpose the first part 16' of the cam portion 16 is constructed with a gradually increasing radius, while the end 18 of said cam portion runs concentric with the shaft 13.

With this arrangement, in the course of one complete revolution of the toothed wheel 7, the dough dividing device 14—which may, as usual, comprise the pressure plate 14' the underside of which forms the plate 14'' for pressing the dough, the network of knives 17', which penetrate through the plate 14'', and the cover ring 14''', which encloses both—is moved downward on to the dough carrying plate or table 19 during the period in which the head 17'' of its guide rod 17 is traversing the first eccentric part 16' of the cam. It remains in this position while the head 17'' of the guide rod 17 slides along the concentric part 18 of the cam 16, so that during this part of the operative cycle the dough can be kneaded. After the direction of motion of the shaft 13 has been reversed, the dough dividing device 14 is again raised when the upper end of the guide rod is raised by the eccentric part 16' of the cam 16. In order to permit of a variety of adjustment of the length of time during which the dividing knives 17' remain in contact with the dough carrying table 19 the points of attachment 20, 21 of the pitman 11 (or, at least one of these points) are (or is) made adjustable, for instance, by means of slots 12' or 21' in radial direction. This kind of construction simplifies the machine parts used for the drive and for carrying out the individual operative movements. In particular it permits the dough pressing and dividing motions to be controlled by only one cam 16. The forces which are particularly important for the pressing motion are, at the same time, transferred directly and with an avoidance of bending movements to the drive of the dough dividing device 14.

Figure 5:
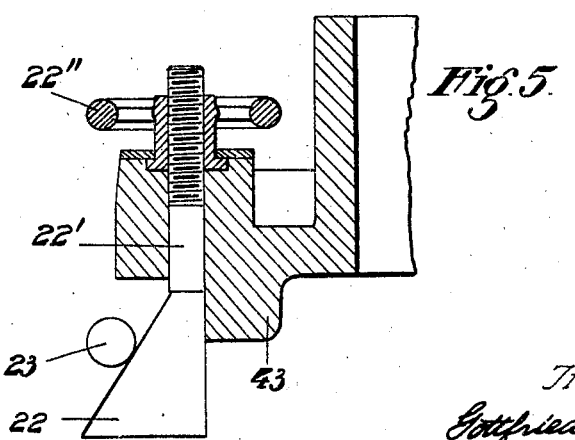
Fig. 5 is a detail view of the stationary wedge for actuating the coupling means between the dough dividing and pressing means, showing the manner in which it is adjustable on the frame of the machine.

In this connection it is necessary that the clutch provided between the pressure plate 14' and the dividing knife 17' be uncoupled when a given pressure is reached or, which amounts to the same thing, when the pressure plate has executed a predetermined stroke. For this purpose there is provided on the bracket 43 of the machine frame (finely adjustable in relation thereto by means, it may be of a spindle 22' and handwheel 22'') a coupling control member 22 (Fig. 5). This member 22 may for instance, take the form of a wedge which is adapted to move the tensional lever 23 sideways for disengaging the coupling 23' between the carrier plate 14⁴ of the pressure plate 14', and the guide rod 17 of the dividing knives, so that the pressure plate is only carried downwards until the plate 14 rests on the dough on table 19. The pressure plate itself may either rest on the dough under the compensating influence of counterweights 35 or the like, or it may be moved upwards to an extent determined by a stop not shown, in order to provide room for the growing kneaded material.

When the knives have divided the dough the clutch 9, 10 is engaged by means hereinafter described and the worm wheel 8 thereby set in motion. The shaft 8' of the wheel 8, as also the parallel shaft 44 which derives rotary motion from the shaft 8' through the coupling rod 45, are furnished at the top ends with pins or eccentrics 46. The two pins or eccentrics engage in corresponding eyes 19' in the dough carrying table 19 and thereby impart circular motion to the latter. Engagement of the coupling jaw 9 is brought about by means of a lever 24 which, under the influence of a spring 25 which in its mid position is situated over the pivot of the lever, can be shifted to either of its end positions in which the coupling 9 is either completely engaged or completely disengaged. The clutch lever 24 is reversed by means of two pawls 26, 27 which are fixed to its two arms and which lie in the paths of cams or tappets 28, 29 on the worm wheel.

When this wheel rotates in the direction indicated by the arrow the tappet 28 draws the pawl 26, and with it, the lower lever arm towards the right, whereby the clutch jaw 9 is engaged, under the action of the spring 25 in the clutch jaw 10, so that kneading commences. Since the pawl 26 is adapted to rotate, the tappet 28 can again disengage itself therefrom during the further rotation of the wheel 7. In like manner the tappet 29 actuates the pawl 27, whereby the spring 25 is drawn into its declutched position as soon as the clutch lever 24 has passed its mid position. The commencement of kneading and the termination of the kneading motion; that is to say, the total duration of the kneading process may, for example, be regulated by making the positions of the tappets or stops 28, 29 on the worm wheel 7 variable in the circumferential direction. For this purpose the stops 28, 29 may be made adjustable in appropriate slots 28', 29' and may be adapted for clamping in any preferred position.

After the kneading clutch 9, 10 has been disengaged a finger 31 mounted on the worm wheel 7 and adapted to contact a similar stop finger 32 on the dough carrying table 19 ensures that this table shall always be brought back to the same starting position. In order that the dough carrying table 19 shall after kneading is finished, always stop in such a position that the finger 31 meets and constrains the finger 32 on the plate 19, it is advisable to arrange the stop 29 not fixedly but adjustable in stages so that disengagement of the kneading clutch 9, 10 always takes place at the instant when the finger 32 on the plate 19 lies in the path of the finger 31.

Figures 4, 4A:
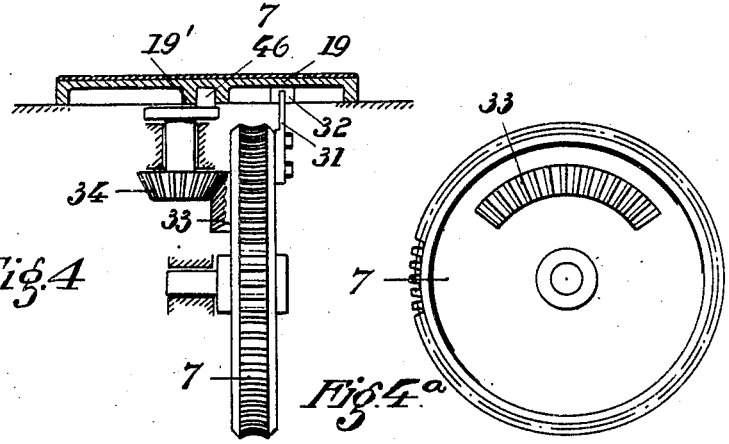
Fig. 4 is a side view of the worm gear used in a form of construction for returning the dough carrying table to initial position.
Fig. 4a is a detail view of this modified form of construction.

The kneading gear, instead of being driven by the worm gearing 6, 8 may be operated by a gear segment 33 (Fig. 4) which, for example, may be mounted on the side of the worm wheel 7. At each revolution of the worm wheel 7 the gear segment enters into engagement once with a gear wheel 34 on the kneading gear. The duration of the kneading process may be determined by the length of the gear segment 33. In this case also the stop fingers 31, 32 may return the dough carrying table to the initial position upon completion of the kneading operation. If the end of the gear segment 33 be correctly positioned so that the teeth of the wheel 34 come out of engagement with the teeth of the segment 33 at a given setting of the kneading table, the fingers 31, 32 always strike one against the other after cessation of the kneading movement.

The dough carrying plate 19 may also be returned to the starting position by means of a weight 42 suspended on a cord 42" which is carried over a roller 42' and the horizontal run of which is fastened at 19" to the plate 19 (Fig. 1). On engaging the clutch 9, 10 the lever 24, through the medium of a tension rod 39, moves the two gear segments 40, 41 in such a manner that the weight 42 is held fast in its uppermost position by a projection 41' on the segment 41. On cutting off the kneading motion the projection on the segment 41 goes back to its initial position, thus the weight 42, which can now fall freely, draws the eccentrically mounted dough carrying plate 19 back into the starting position.

Figure 3:
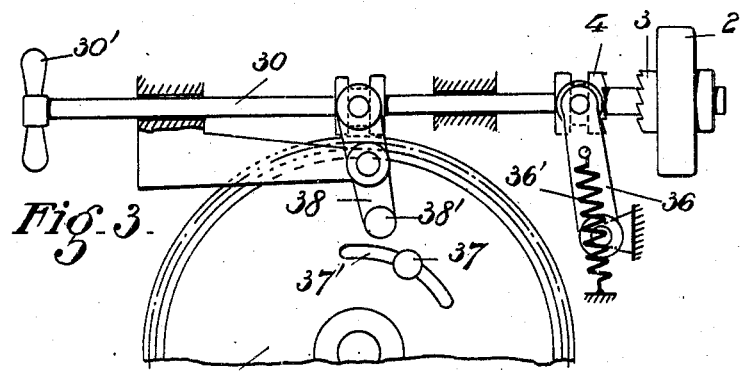
Fig. 3 is a detail view of the operating mechanism for the main clutch on the main shaft.

For engaging the main clutch 3, 4 of the shaft 1 it is preferable to use a clutch lever 36 (Fig. 3) constructed similarly to the kneading clutch lever. This lever 36, also, is moved into its two terminal positions by a suitable spring 36'. To the lever 36 is connected the clutch operating rod 30 which carries, in an easily accessible position, the handle 30' for engaging and disengaging the clutch. With this rod 30 there also engages the bell-crank lever 38, pivoted in the frame. This lever has a part 38' which may have a somewhat pawl-like formation and is controlled by a stop 37 on the worm wheel, which stop may be adjustable in a slot 37' so that the clutch is disengaged at the end of the working movement while the machine, after the pawl 27 has been disengaged from its tappet 29, can be set in operation once more by means, for instance, of the handle 30'. By reason of this construction the clutch 3, 4 can at all times be disengaged while in motion by pulling on the handle 30' and the machine thus brought to a stand still.

I claim:—

1. The combination with the dough dividing means and the dough pressing means of a dough dividing and working machine, of cam means for reciprocating the dough dividing means only, and mechanism for imparting motion to said dough pressing means from the dough dividing means said mechanism including a coupling between said pressing means and dividing means, and a wedge for disengaging said coupling.

2. The combination with the dough dividing means and the dough pressing means of a dough dividing and working machine, of cam means for reciprocating the dough dividing means only, mechanism for imparting motion to said dough pressing means from the dough dividing means, and a rotating dough carrying table for supporting dough in position to be operated on by said dividing and pressing means.

3. The combination with the dough dividing and working means of a dough dividing machine, of mechanism for actuating said means, said mechanism including an oscillating cam, a positively driven gear, and a pitman connected to said cam and gear and adjustable at its points of connection.

4. The combination with the dough dividing and working means of a dough dividing machine, of mechanism for actuating said means, said mechanism including a camshaft, an oscillating cam having a cam groove which is partly eccentric to said shaft and partly concentric therewith, and a plunger connected to the dough dividing and working means and having a follower disposed in said cam groove.

5. The combination with the dough dividing and working means of a dough dividing machine, of a rotatable dough carrying table, a positively driven gear, a clutch for rotating said table, means connected to said gear for operating said clutch and a device for rotating said table to a predetermined position when said clutch is in inoperative position.

6. The combination with the dough carrying table of a dough dividing machine, of a clutch for operating said table, a positively driven gear, and adjustable means connected to said gear for operating said clutch.

7. The combination with the dough carrying table of a dough dividing machine, of means for rotating said table, and means for returning said table to initial position, said table rotating means including a cam operated clutch and cams for engaging and disengaging said clutch.

8. The combination with the vertically reciprocating dough dividing mechanism and the dough pressing mechanism of a dough dividing machine, of means for operatively connecting said mechanisms during the reciprocations of said dividing mechanism to reciprocate said pressing mechanism with said dividing mechanism, means for reciprocating said dividing mechanism, and a stationary device for actuating said connecting means at a predetermined position of said pressing mechanism to disconnect said mechanisms on the downward stroke of said dividing mechanism and connect said mechanisms on the upward stroke of said dividing mechanism.

9. The combination with the vertically reciprocating dough dividing mechanism and the dough pressing mechanism of a dough dividing machine, of means for operatively connecting said mechanisms during the reciprocations of said dividing mechansm to reciprocate said pressing mechanism with said dividing mechanism, means for reciprocating said dividing mechanism, and a stationary device for actuating said connecting means at a predetermined position of said pressing mechanism to disconnect said mechanisms on the downward stroke of said dividing mechanism and connect said mechanisms on the upward stroke of said dividing mechanisms, said means including a yieldable coupling between said mechanisms and said device including a stationary wedge adapted to engage said coupling.

In testimony whereof I affix my signature.

GOTTFRIED RAUSCH.